US011960785B2

(12) United States Patent
Kidakarn

(10) Patent No.: US 11,960,785 B2
(45) Date of Patent: Apr. 16, 2024

(54) MULTI COLLECTIBLE STORAGE APPARATUS

(71) Applicant: Infinity Pieces Inc., Hermosa Beach, CA (US)

(72) Inventor: Michael Kidakarn, Lawndale, CA (US)

(73) Assignee: INFINITY PIECES INC, Manhattan Beach, CA (US)

( * ) Notice: Subject to any disclaimer, the term of this patent is extended or adjusted under 35 U.S.C. 154(b) by 0 days.

(21) Appl. No.: 17/984,158

(22) Filed: Nov. 9, 2022

(65) Prior Publication Data
US 2023/0147339 A1    May 11, 2023

Related U.S. Application Data

(60) Provisional application No. 63/278,043, filed on Nov. 10, 2021.

(51) Int. Cl.
*G06F 3/147* (2006.01)
*H04L 9/32* (2006.01)

(52) U.S. Cl.
CPC ............ *G06F 3/147* (2013.01); *H04L 9/3213* (2013.01); *H04L 2209/603* (2013.01)

(58) Field of Classification Search
CPC ... G07D 9/002; G06F 12/0246; G06F 16/532; G06F 16/2379; G06F 16/54; G06F 3/011; G06F 3/147; G06F 1/1616; G06F 1/1626; G06F 1/1628; G06F 1/1647; G06F 1/1656; G09F 1/04; G09F 5/02; G09F 27/00; G09F 3/00; G09F 3/20; G09F 9/30; G09F 3/185; H04L 9/3213; H04L 2209/603; G09G 2380/16; G09G 5/003; A47G 1/12; B42D 15/045; B42D 15/042; G11B 33/025

See application file for complete search history.

(56) References Cited

U.S. PATENT DOCUMENTS

| | | | | |
|---|---|---|---|---|
| 11,487,850 B1* | 11/2022 | Nieto | ................... | G06Q 10/083 |
| 2008/0023371 A1* | 1/2008 | Macor | ....................... | G09F 5/02 |
| | | | | 206/775 |
| 2010/0318534 A1* | 12/2010 | Kaufman | .............. | G06F 16/907 |
| | | | | 707/609 |
| 2013/0275251 A1* | 10/2013 | Glass | .................... | G06Q 30/06 |
| | | | | 705/26.1 |
| 2021/0067342 A1* | 3/2021 | Guinard | ................ | H04L 9/0866 |
| 2023/0073859 A1* | 3/2023 | Matthews | ........... | G06Q 20/389 |
| 2023/0090476 A1* | 3/2023 | Yglesias Mora | .... | H04L 9/3213 |
| | | | | 359/9 |
| 2023/0128790 A1* | 4/2023 | Mayne | .................. | H04L 9/0863 |
| | | | | 713/172 |

\* cited by examiner

*Primary Examiner* — Koosha Sharifi-Tafreshi

(57) ABSTRACT

A multi collectible storage apparatus has a display electronic screen on the front side, the screen displaying a digital asset; and a storage protection enclosure compartment on the back side, the enclosure compartment storing a physical collectible, which is associated to the digital asset. The apparatus provides a combination of displaying a digital asset and preserving associated physical collectible, resulting in a fully and deeply experience for navigating the asset visually and acoustically, and meanwhile protecting the valuable physical collectible from damage and decaying.

14 Claims, 9 Drawing Sheets

MULTI COLLECTIBLE STORAGE APPARATUS

FIELD OF THE INVENTION

The present invention is in the field of a multi collectible storage apparatus and pertains particularly to an apparatus for a combination of displaying a digital asset and storing an associated physical asset thereof.

BACKGROUND OF THE INVENTION

The main function of a general storage frame (such as a photo frame) is to allow the carried items (or pictures) to be displayed on a desktop, above a cabinet, on a shelf, on a wall, or in an open space. However, the general storage frame structure only has the expected function of placing decorations or framing photos. Even if it can be used for ornamental and decorative purposes, it has no other purposes. It is quite monotonous in terms of functionality and obviously cannot satisfy modern people's multi-functional desire for a single product. Moreover, because the process of replacing the exhibits is complicated, it is usually only replaced once in a long time, which will make the viewer feel monotonous and uninterested. As a result, digital photo frames have emerged that allow users to quickly change what is displayed, and even display more content by playing videos. However, the digital photo frame also has the same problem as the traditional storage frame, that is, the function is relatively monotonous, and the items displayed by the digital photo frame are difficult to bring the viewers a physical experience as if it were a real object.

In view of this, whether it is a traditional storage frame or a digital photo frame, the applicant of the present invention believes that it is necessary to conceive a storage frame that has the basic functions of the photo frame and also has other meanings or functions at the same time, so as to increase the use value and ornamental value of the frame, and utilize the digital screen to provide additional, historic or relevant information regarding the physical collectible and make the storage frame more suitable for daily life, and have a simple and elegant effect.

SUMMARY

In order to solve the above-mentioned problem, the present invention provides a multi collectible storage apparatus, the apparatus comprising: a display electronic screen on the front side, the screen displaying a digital asset; and a storage protection enclosure compartment on the back side, the enclosure compartment storing a physical collectible; wherein the physical collectible is associated to the digital asset.

In another aspect, the digital asset is selected from NFTs (Non-Fungible Token), electronic books, videos, photos, audios, digital autographs, digital 3D artworks, artificial intelligence generated artwork, or a combination thereof.

In another aspect, the physical collectible is selected from trading cards, protective housings for trading cards, decorative panels, works of art, autographs, photographs, comic books, QR codes, postcards, precious stones, and artifacts, collectible toys, figurines, sculptures, physical media discs, diplomas, certificates, awards, letter, statistics and information, advertisements, and business cards.

In another aspect, the electronic screen displays NFTs, digital videos, photos, digital version of comic books, digital version of collectible cards, or a combination thereof.

In another aspect, the apparatus further comprises a built-in memory, storing multiple digital assets for displaying on the electronic screen.

In another aspect, the apparatus comprises a built-in speaker for audio output.

In another aspect, the apparatus comprises at least one button for controlling the displaying of the digital asset on the screen.

In another aspect, the enclosure compartment has a cavity shaped in the size and depth to fit the physical collectible; accordingly, the apparatus further comprises a convex cover on the back side to fit the cavity, and the convex cover is pivoted with the down edge or side edge on the back side of the apparatus.

In another aspect, the apparatus comprises a charge slot at the edge on the back side.

In another aspect, the apparatus is running out of battery, the apparatus is turned over from the front side to the back side, exhibiting the physical collectible to observers.

The present invention also provides another kind of a multi collectible storage apparatus to better solve the problem, the apparatus comprising: a display electronic screen on the front side, the screen displaying NFT digital assets, wherein the digital assets are cryptographically secured in a decentralized database; a storage protection enclosure compartment on the back side, the enclosure compartment storing physical collectibles associated to the digital assets; a scanning unit to scan tokens, wherein the storage addresses of the digital assets are mapped into the tokens; and a processor to identify the tokens and retrieve the data from the decentralized database; wherein, the tokens are one-to-one corresponded to the digital assets exclusively.

In another aspect, the digital assets are selected from digital tokens, certificates, paintings, photographs, sculptures, GIFs, videos, audios, or the combination thereof.

In another aspect, the physical collectible is selected from trading cards, protective housings for trading cards, decorative panels, works of art, autographs, photographs, comic books, QR codes, postcards, precious stones, and artifacts, collectible toys, figurines, sculptures, physical media discs, diplomas, certificates, awards, letter, statistics and information, advertisements, and business cards.

In another aspect, the scanning unit is selected from a built-in camera, QR or Barcode scanner, keyboard, microphone, or handle gun-type scanner.

Furthermore, the present invention provides a method for acquisition of NFT digital assets to help the apparatus works, the method comprising:
identifying a token of a cryptographical digital asset;
retrieving the corresponding digital asset;
accessing the digital asset; and
displaying of the digital asset.

In another aspect, the identifying comprises scanning, typing, or sending the token of the digital asset to a processor of the multi collectible storage apparatus In another aspect, the retrieving includes a search in a decentralized database to locate the corresponding digital asset based on the identified token.

In another aspect, the token one-to-one corresponds to the digital asset.

In another aspect, the accessing includes decrypting the digital asset and obtaining the information thereof.

In another aspect, the displaying includes presenting the digital asset, the information thereof, or combination on the display electronic screen.

Last but not least, the present invention provides another embodiment of a multi collectible storage apparatus, the apparatus comprising: a display electronic screen on a surface of the apparatus, the screen displaying a digital asset; and a storage protection enclosure compartment on the surface of the apparatus, the enclosure compartment storing a physical collectable, wherein the enclosure compartment and the screen are arranged side-by-side on the surface of the apparatus; wherein the physical collectable is associated to the digital asset.

In another aspect, the enclosure compartment has a cavity shaped in the size and depth to fit the physical collectible; accordingly, the apparatus further comprises a convex cover on the surface to cover the cavity and the screen.

In another aspect, the convex cover is pivoted with the down edge or side edge on the surface of the apparatus.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1A:
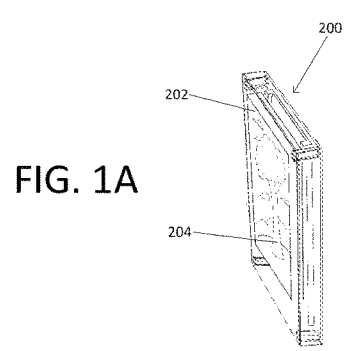
FIG. 1A is a diagrammatic illustration of the front side view of a multi collectible storage apparatus, in accordance with an embodiment of the present invention.
Figure 1B:
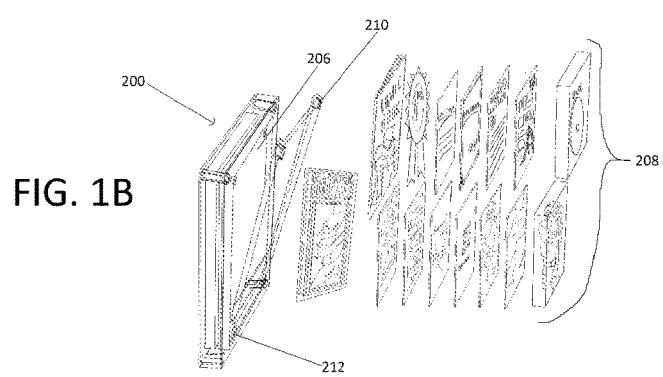
FIG. 1B is a diagrammatic illustration of the back side view of a multi collectible storage apparatus for assortment of physical collectibles, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in all the FIGs. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

One of the objectives of the present invention is to provide a multi collectible storage apparatus, which is able to store a combination of the digital assets and physical versions thereof.

Another objective of the present invention is to provide a presentation of the digital assets, i.e., displaying the video and audio of the digital assets.

Another objective of the present invention is to provide a preservation and storage of the physical assets, including comic books, trading cards, photographs, posters, paintings, etc.

A typical embodiment of the present invention is shown as FIGS. 1A (the front side viewing) and 1B (the back side viewing), providing a multi collectible storage apparatus 200. The apparatus 200 in the embodiment, comprises a display electronic screen 202 on the front side, the screen 202 displaying a digital asset 204; and a storage protection enclosure compartment 206 on the back side, the enclosure compartment 206 protecting a physical collectible 208, which is associated or related to the digital asset 204.

In an aspect of the embodiment, the digital asset 204 may be selected from some digital collectibles, specifically NFTs (Non-Fungible Token), or it can also be videos or images associating with the physical collectible. In addition, For the examples for the physical collectible, it includes but not limits to these forms: such as trading cards, decorative panels, works of art, autographs, photographs, comic books, QR codes, postcards, precious stones, and artifacts, collectible toys or figurines, sculptures, physical media discs, diplomas, certificates, awards, letters, statistics and information, advertisements, and business cards, etc. Specifically, the digital asset is associated to the physical collectible correspondingly.

A typical example for the association in the present invention is that the electronic screen 202 displaying NFTs, digital videos, digital photos, digital assets, digital version of comic books, 3D artworks, digital version of collectible cards; accordingly, what the back compartment 206 has stored and preserved are related physical collectibles, for example, sports trading cards, comic books, and autographs, photographs, etc. For example, a rare and precious comic book is enclosed in the protective compartment 206 of the apparatus 200, simultaneously the electronic screen 202 is displaying the official and authentic electronic version of the comic book, preferably, combined an audio narration of the comic story for the viewers and listeners to enjoy and experience the contents of the comic book. Alternatively, the digital asset may be NFTs, and the digital asset might also generated by AI.

By presenting the association and combination of the digital asset 204 and the physical collectible 208 in the apparatus 200, the invention provides a way for collectors or observers to enjoy, view, listen, interact, learn about their physical collectibles without a physical touching, consequently avoiding to risking of a damage to the collectibles. It is well-known that collectibles are valuable and treasured, but they are easily to become contaminated and decayed inevitably during some touching occasions, like an observation. Thus, a displaying the digital presentation and display related to the physical collectible, will increase observers' experience at depth when navigating the asset, and meanwhile avoid the contacting and decaying of the physical collectibles.

Figure 1C:
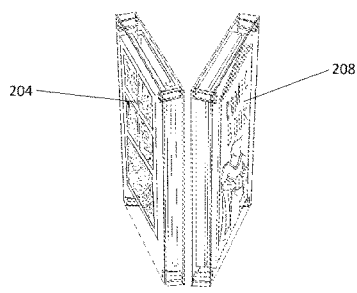
FIG. 1C is a diagrammatic illustration of a combination of the digital asset displaying and the associated physical collectible storing of a comic book inside a protective casing, in accordance with an embodiment of the present invention.
Figure 1D:
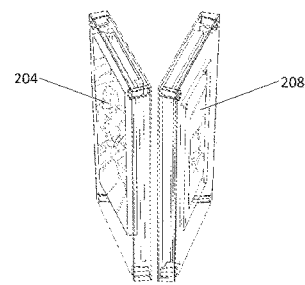
FIG. 1D is a diagrammatic illustration of a combination of the digital asset displaying and physical collectible storing of a trading card inside a protective casing, in accordance with an embodiment of the present invention.
Figure 1E:
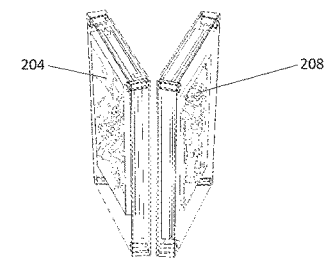
FIG. 1E is a diagrammatic illustration of a combination of the digital asset displaying and the associated physical collectible storing of a toy figurine, in accordance with an embodiment of the present invention.

FIGS. 1C, 1D and 1E typically illustrate three examples of a combination of the digital asset displaying and the associated physical collectible storing.

An example in the embodiment, the apparatus may preserve the collectibles of comic books, shown in FIG. 1C. The valuable comic book is stored in the protective compartment 206 on the back side of the apparatus 200 in a good condition, without any exposure to contaminants. At the same time, the electronic screen 202 on the front side is displaying some audio and video narration with a panel arrangement. The panel consists of some drawings depicting a story moment of the comic book, some words describing a dialogue or speech of comic characters. The displaying content on the electronic screen 202 follows the sequence of the collectible comic book's content, and is subject to display circularly. Thus, the apparatus in this example is able to preserve the comic books from damages, and to satisfy the desire of comic fans for reading and enjoying the comic book anytime.

An alternative example in the embodiment, the apparatus may preserve the collectibles of sports trading cards, shown in FIG. 1D. The rare and precious physical trading cards is enclosed in the protective compartment 206 of the apparatus 200, and simultaneously the build-in electronic screen 202 on the front side is displaying some highlights of the athletes, i.e., their best performance, their iconic movements or postures on the court/field or their career statistics and accomplishments, etc. Preferably, the physical trading card has an autograph of the athlete, Alternatively, an NFT digital asset related to those athletes may be displayed on the electronic screen. More specifically, a trading card of an all-star basketball player is preserved in the compartment 206 on the back side of the apparatus, which is valuable and memorable, the electronic screen 202 displays his symbolic moves (i.e., fade away shot and slam dunk), preferably a built-in speaker of the apparatus displaying the basketball court ambient audio and applause voice of audiences. Thus, such an example will create an enjoyable and memorable atmosphere for sports fans, which increases the value of a single physical trading card, or digital asset thereof, or the combination thereof.

An alternative example in the embodiment, the apparatus may preserve the collectibles of toy figurines, shown in FIG. 1E. Instead of placing a single physical toy figurine on the exhibition table, in this example it is positioned in the compartment 206 on the back side of the apparatus, preferably in an airtight condition, thereby avoiding a high risk of being broken. More importantly, simultaneously, the electronic screen 202 on the front side is displaying an associated digital action character and signature movements or postures thereof. Preferably, a build-in speaker of the apparatus 200 may output some famous sayings or mottos. For example, when a space soldier toy figurine is well-positioned in the compartment 206, the electronic screen 202 may be displaying the iconic action of laser-shooters, with the motto voice "no soldier left alone" from the speaker.

Likewise, there are lots of variants of a combination of the digital asset displaying and the associated physical collectible storing for different items. When the apparatus holds a physical autograph of a celebrity or famous persons in the compartment, accordingly the electronic screen 202 would display some information about the autograph, including an introduction of the celebrity and signing events. Also, the autographs or signing event may be an NFT.

Alternatively, when the apparatus stores a physical photograph in the compartment 206, accordingly the electronic screen 202 would display some related information about the photograph, including the photographer, the location, and the video story behind the scene, etc. For example, when a famous photograph of an American sailor kissing a woman in Times Square to celebrate the end of World War II, is enclosed in the compartment 206, meanwhile the electronic screen 202 on the front side is displaying some background scene in American at the end of World War II, like symbolic excitement and joy of the parading sailor, with the voice narration about World War II history. Via the immersing sounds and visions, the observer will be emotionally bonded and connected to the memorable history, and appreciate the inspirations of those war heroes deeply. Therefore, such an apparatus will flesh out the appreciation to the physical photograph, and accordingly increase the value thereof.

To be mentionable, the apparatus 200 may be used specifically to protect the physical works of art, and meanwhile to exhibit the artwork to observers clearly and comprehensively. The rare and precious physical work is enclosed in the protective enclosure compartment 206, avoiding the risking of damage and contamination. Preferably, the artist's signature is also enclosed in the unit, giving authenticity to the digital version presentation and resulting in an increase in value (of the NFT) or related comic book or trading card or works of art.

Thus, combined with the digital asset and physical collectible in an apparatus, the invention associates the single digital asset to the physical version, consequently increasing the value of the digital and physical collectibles via bringing in a validation and authentication. Meanwhile, the association between the digital and physical assets flesh out the physical collectible and increase the interactions with the collectibles result in a more joyful and fully experience upon observation.

Another advantage of the apparatus of the embodiment over those current electronic displaying devices, such as digital frames, monitors and displays, is that the apparatus is allowed to exhibit the physical collectible on the back side if the front electronic screen has exhausted all the battery capacity. Under the situation of the apparatus out of battery, the apparatus can be turned over from the front side (having electronic screen) to the back side (having the protective compartment), thereby re-displaying the associated items to keep the continuation of the appreciation by observers.

In another aspect of the embodiment, the apparatus 200 further comprises a built-in memory, storing multiple digital assets for displaying on the electronic screen 202. In a preferable example, the apparatus 200 possesses numerous digit assets for one type, and/or different types of digital assets, including NFTs, E-books, videos, audios, images, etc. Those digital assets are saved in the said built-in memory. If needed, collectors may choose a targeted digital asset to display on the electronic screen 202.

Figure 2:
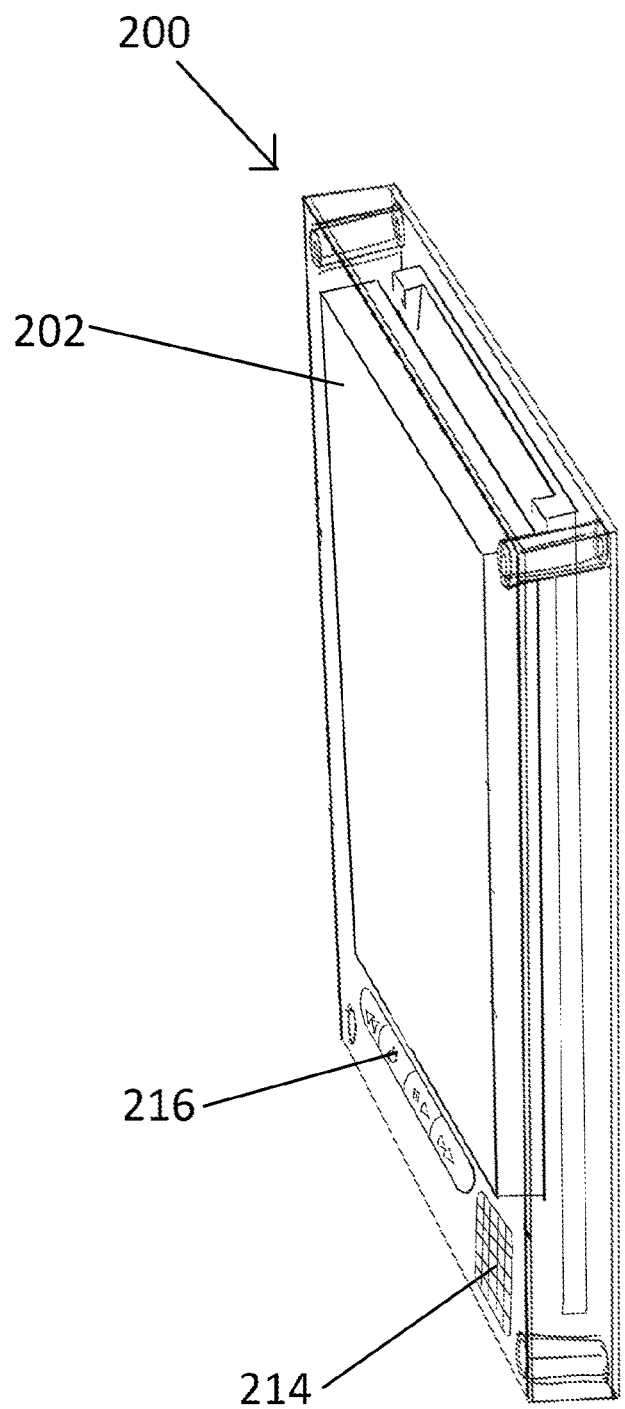
FIG. 2 is a diagrammatic illustration of a multi collectible storage apparatus comprising at least one button and a speaker, in accordance with an embodiment of the present invention.

In an aspect of the embodiment, the apparatus 200 has a built-in speaker 214 (shown in FIG. 2) for audio output. A sound from the speaker 214 may be selected from the narration of a story, a dictation of a book, an ambient sound in the game, or an interpretation of the physical collectible. The sound may create a fully immersing experience to the listeners.

In another aspect of the embodiment, the apparatus 200 has at least one button 216 (shown in FIG. 2) on the front surface. Preferably, there are several buttons for different functions, including Power on/off, Volume up/down, Mute, Play, Pause, Next, and Previous. With those buttons, the users or observers can approach to the next page or previous page; Also, those buttons may be used to turn on/off the build-in audio speaker for an automatic audio, and the adjustability of the volume of the audio. In addition, collectors may utilize the button to choose what digital asset they would like to display.

In another aspect of the embodiment, the enclosure compartment 206 has a cavity shaped in the size and depth to fit the physical collectible 208. Under this situation, the physical collectible 208 are exactly accommodated into the cavity without any extra gap or crinkle. Thus, it can be preserved and stored in a complete safe status and observed in a fully perspective view.

In another aspect of the embodiment, the apparatus 200 further comprises a convex cover 210 on the back side to fit the cavity. Such as the configuration for the enclosure compartment can ensure the seal between the cavity and convex cover, preventing the dust, liquid or air from coming into the cavity to contaminate the physical collectible.

Preferably, the convex cover 210 is pivoted with the down edge or side edge on the back side of the apparatus 200, thereby establishing an integration of the convex cover and the apparatus to facilitate the open or close the convex cover.

In another aspect of the embodiment, the apparatus 200 comprises a charge slot 212 at the edge on the back side.

In another aspect of the embodiment, the apparatus 200 further comprises a stand to support the apparatus on a platform.

Take it together, the embodiment provides a multi collectible storage apparatus, resulting in a combined storage and display of the digital asset and associated physical collectible. When in operation or utilization of the apparatus, collectors or observers can easily identify or observe the physical collectible on the back side, and meanwhile watch the illustration of the digital assets on the electronic screen. Such an experience creates a sensation and stimulation emotionally in a deep impression, at the same moment that the physical collectibles are kept from decaying and contaminant.

Furthery, the present invention also provides an alternative embodiment, especially for a combination of an NFT digital asset exhibition and its associated physical collectible storage.

In the embodiment of the present invention related to NFT, an NFT (Non-Fungible Token) refers to a unique digital asset that represents ownership of physical items or collectibles like art, video clips, music, autographs, photographs, and more. NFTs use a special blockchain technology that powers cryptocurrencies.

In this new embodiment, FIGS. 3A-5 are some diagrammatic illustrations of a multi collectible storage apparatus for the combined exhibition for an NFT digital asset and its physical collectible, and the functional implementation thereof.

Specifically, rather than comprising an enclosure compartment for an associated physical collectible, a multi collectible storage apparatus 100 in this alternative embodiment is a hardware device that is able to access and display the digital assets via decentralized or blockchain technology. The apparatus 100 has a display electronic screen 102 on the front side, displaying a digital asset 108; and a storage protection enclosure compartment on the back side, the enclosure compartment protecting and storing a physical collectible 112, which is associated or related to the digital asset 108; the apparatus 100 also has a scanning unit 104 mounted on a surface of the apparatus 100; the apparatus 100 also has a built-in processor to read/write data from a decentralized database.

In this example, each of the digital assets for NFTs stored in the decentralized database is referred to an exclusive and non-counterfeited address. Technically, the address is composed of a definite length of numbers and letters. When the address is requested or identified, the corresponding digital asset will be read, furtherly be displayed or viewed. Also, the digital apparatus 100 can contain metal edges surrounding the screen, and a stand on its back to support itself on the platform.

In this example, the processor is used to read/write memory. Preferably, the processor controls the apparatus to identify the tokens and retrieve the data from the decentralized database.

In this example, the storage addresses of the digital assets in the decentralized database are mapped to correspond to the token.

The scanning unit 104 may be selected from a built-in camera, QR or Barcode scanner, or even a handle gun-type scanner. The display screen 102 is touchable screen in an alternative embodiment.

Figure 3A:
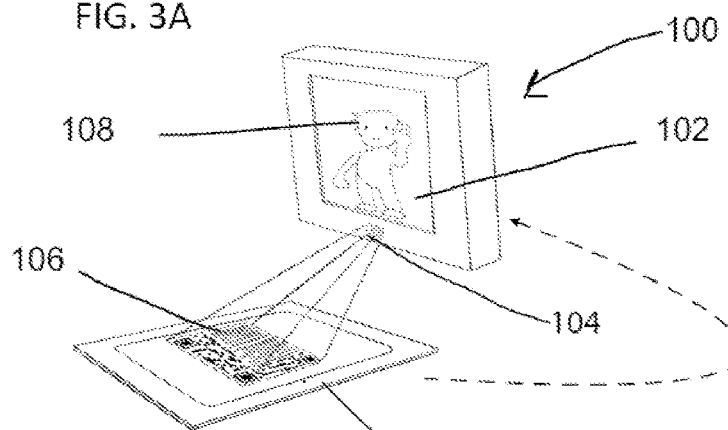
FIG. 3A is a diagrammatic illustration of a multi collectible storage apparatus especially for a combination of an NFT digital asset and physical collectible, in accordance with an embodiment of the present invention.
Figure 3B:
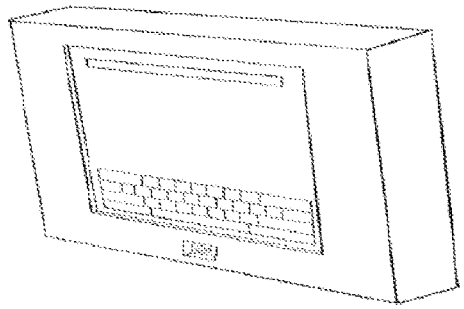
FIG. 3B is another diagrammatic illustration of a multi collectible storage apparatus especially for a combination of an NFT digital asset and physical collectible, in accordance with an embodiment of the present invention.
Figure 3C:
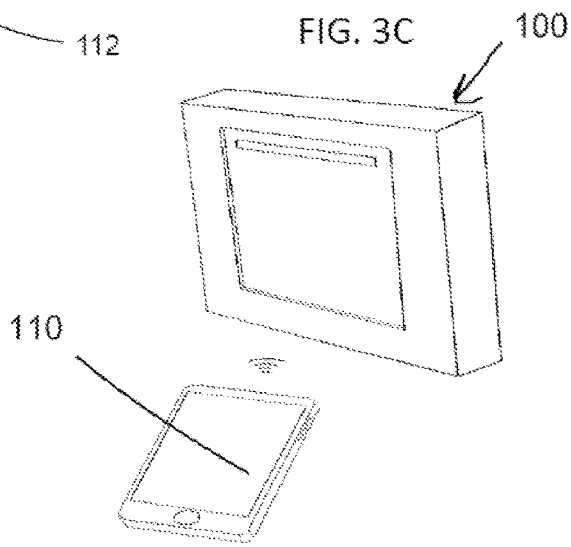
FIG. 3C is another diagrammatic illustration of a multi collectible storage apparatus especially for a combination of an NFT digital asset and physical collectible, in accordance with an embodiment of the present invention.

FIGS. 3A, 3B, 3C illustrate three alternative examples of a multi collectible storage apparatus of displaying an NFT digital asset through scanning on the electronic screen on the front side, and simultaneously storing the associated physical collectible in the compartment on the back side (the back side view is not shown in FIGS. 3A, 3B, 3C).

In these examples, the digital assets are selected from digital tokens, certificates, paintings, photographs, sculptures, GIFs, videos, audios, or the combination thereof.

In these examples, the associated physical collectible is selected from trading cards, decorative panels, works of art, autographs, photographs, comic books, QR codes, postcards, precious stones, and artifacts, collectible toys of figurines, sculptures, statistics and information, advertisements, and business cards.

FIG. 3A is an illustration for an example of the multi collectible storage apparatus of displaying an NFT digital asset 108 through scanning on the electronic screen 102 on the front side via scanning a token 106, and simultaneously storing the associated physical collectible 112 in the compartment on the back side. Via scanning a token 106, the apparatus 100 is able to access and display a digital asset 108 on the screen 102. The token 106 is a representative symbol in the forms of long alphanumeric strings, QR codes, Barcodes, etc. to visualize a storage address linked into Blockchain. The token 106 also may be presented in any scannable form, like printed on papers or cards or loaded on the screen of a device (i.e. a phone or a display). The digital asset 108 may be any type of cryptographically digital collectibles or artworks, including but not limited into digital tokens, certificates, characters, comic books, paintings, photographs, sculptures, GIFs, video, audio, or even any work created by creators. The digital asset 108 and information thereof has been stored or registered in Blockchain, instead of the Internet or Server. The token 106 is exclusively mapped/corresponded to the digital asset 108 in the blockchain database so that the cryptographically secured digital assets can be retrieved and accessed safely and accurately, wherein the token and the digital asset 108 are only corresponded to each other.

In the embodiment, the token 106, in the forms of QR codes or Barcodes, may be printed on a flat distribution, including papers and cards. Alternatively, the token 106 may be loaded on the screen of a third device, i.e., a phone or tablet. In a preferable example, the token 106 is printed on an associated physical collectible 112, such as a valuable comic book or photograph album. Once the token 106 on the associated physical collectible 112 is scanned, the associated physical collectible 112 is placed in the compartment (not shown in FIG. 2) on the back side of the apparatus 100 for protection and storage.

FIG. 3B is an illustration for another embodiment of the multi collectible storage apparatus of displaying a digital asset via typing input. Collectors can input the access address of the digital asset via typing on the screen.

FIG. 3C is an illustration for another example of the multi collectible storage apparatus of displaying a digital asset through a communication with an external device 110. The external device 110 may be selected from a phone or processor. The communication would be selected from a technology of NFC, Bluetooth, or Wi-Fi. Via the communication, the external device 110 sends the token to the apparatus, and then the apparatus 100 can access to the digital asset in the decentralized database or system, preferably in Blockchain. In an alternatively example, the apparatus 100 may scan from the loaded token(s) on a phone or another display to access the digital asset.

Once retrieving and accessing the digital asset, the digital asset will be displayed on the electronic screen of the apparatus 100. Preferably, via an acquisition and identification of token address, the apparatus 100 has unlocked all the relative encryption of the digital asset, and the users can view the digital visually. Take a digital photograph as an example, once the token (i.e., in the form of QR Code) linked to the photograph is scanned, the NFT scan digital apparatus 100 not only displays photograph on the screen 102, but also optionally presents the photographic information including the photography date, resolution, lens, size, photographer, etc. Meanwhile, the presented information on the screen 102 also may include registrations and transactions information, including the history of registration or transaction (trade date and price), platform, buyer, vendor, and certificate organization, ID identification, etc. Meanwhile, the physical printed photograph is placed in the compartment on the back side of the apparatus 100, protecting the physical printed photograph from decaying and fading.

In one aspect of the embodiment, a built-in speaker of the apparatus 100 can output an audio related to the photograph. The audio may be selected from a voice narrative story behind the scene or an ambient sound of environment, like ocean wave, bird singing, insect hum, or the combination thereof.

In another aspect characterized with a 3D artwork or video created digitally, once scanning the token 106, the apparatus 100 would exhibit the 3D artwork animatedly in different viewings or broadcast the video.

Preferably, the apparatus 100 in this embodiment can access multiple digital assets or different types of digital assets so that the apparatus 100 can display different digital assets in a loop on the screen. That is said, the apparatus 100 can store and collect the digital assets.

In another aspect of the embodiment, the apparatus 100 may be mounted on the wall, desk, or floor. Preferably, a magnet is mounted on the apparatus's back surface so that the apparatus can be attached to the wall or refrigerator without fasteners.

In another aspect of the embodiment, the enclosure compartment has a cavity shaped in the size and depth to fit the physical collectible. Under this situation, the physical collectible is exactly accommodated into the cavity without any extra gap or crinkle. Thus, it can be preserved and stored in a complete safe status and observed in a fully perspective view.

In another aspect of the embodiment, the apparatus further comprises a convex cover on the back side to fit the cavity. Such as the configuration for the enclosure compartment can ensure the seal between the cavity and convex cover, preventing the dust, liquid or air from coming into the cavity to contaminate the physical collectible.

Preferably, the convex cover is pivoted with the down edge or side edge on the back side of the apparatus, thereby establishing an integration of the convex cover and the apparatus to facilitate the open or close the convex cover.

Likewise, in this embodiment, the apparatus has a power charging slot at the edge on the back side. In addition, the apparatus furtherly comprises a stand to support on a platform.

Figure 4:
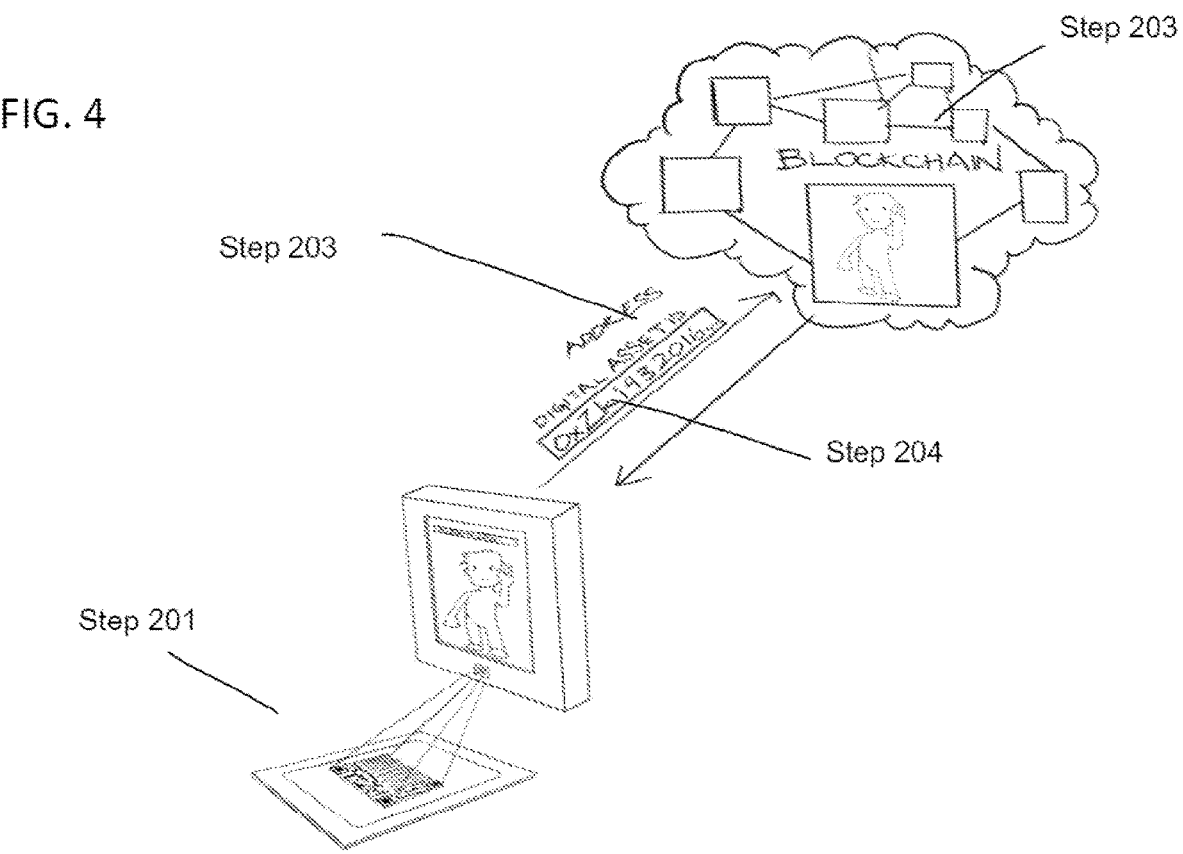
FIG. 4 is a diagrammatic illustration of a representative acquisition of an NFT digital asset via scanning implemented in the apparatus shown FIG. 2A, 2B, or 2C, in accordance with an embodiment of the present invention.

FIG. 4 is a diagrammatic illustration of a representative flowchart for acquisition of a digital asset via scanning in accordance with an embodiment of the present invention. The process for acquisition comprises:

Step 201, identifying a token of a digital asset;
Step 202, retrieving the corresponding digital asset;
Step 203, accessing the digital asset; and
Step 204, displaying of the digital asset.

In this embodiment, the exemplary computation or operation for the acquisition can be performed preferably in the following specified ways:

Step 201, identifying a token of a digital asset. Users can request the token of the digital asset which will be displayed on the screen of the multi collectible storage apparatus described as FIG. 3 to identify. Scanning, typing, or sending the token, i.e. digital ID or Address of the digital assets. In this embodiment shown in FIG. 3, preferably the token is scanned to perform the identification of the token. The token is exclusively linked to the digital asset stored and encrypted in the decentralized database. The identification operation results in a readable alphanumeric string (the storage address of an NFT digital asset) in a memory.

Step 202, retrieving the corresponding digital asset. After obtaining and analyzing the token, i.e. identifying the binary address of the token, the apparatus will execute a search in a decentralized database, preferably Blockchain. Please note that the database is substantially decentralized, instead of being connected to the Internet centralized Server. The requested digital assets are stored and distributed in the decentralized database ledger, and each of them is mapped into (corresponded to) an exclusive token, where the token and the digital asset are only corresponded to each other. The step 202 operation is aimed to retrieve the encrypted digital asset(s) mapped with the exclusive token(s).

Step 203, accessing the digital asset. After a retrieve operation, only a digital asset mapped into the token is located and targeted. Once the token and targeted digital asset are verified, the "block" for storing the digital asset is decrypted, and consequently the digital asset itself and info thereof (biographic and trade info) are accessed.

Step 204, displaying of the digital asset. Once the digital asset itself and info thereof (biographic and trade info) are unlocked, the digital asset is displayed on the screen of the apparatus. In this embodiment, if the digital asset integrates some sonic elements, like music, the apparatus will play the them. If the digital asset includes visual elements, like a 3D artwork, video, painting, or picture, the apparatus will play and exhibit them in different angles.

In another example of the embodiment, the digital apparatus can access and store numerous digital assets. Optionally, the apparatus can display multiple digital assets on the electronic screen simultaneously. For example, the displaying electronic screen can be split into different sections, and different digital assets can be displayed in different sections of the split screen simultaneously.

In this embodiment, the decentralized database is a secured and encrypted system for accessing or managing a digital asset protected in the database, preferably on a blockchain ledger. Meanwhile, in a real-world, there is a physical collectible associating with the digital asset saved in the database. Differing from the digital asset saved in decentralized database, the associated physical collectible is stored in the compartment (208, shown in FIG. 1) on the side back of the apparatus. The token is collected and distributed in visualization forms of a digital address so that it can be scanned or identified by the apparatus 100. The database is decentralized, preferable Blockchain ledger. The digital asset "block" is cryptographic and will be verified when an operation of retrieve is running in the Blockchain to decrypt the "block". The "block" comprises the digital asset itself and digital supporting information thereof. The supporting digital information includes but not limited to the creation date, creator introductions, transaction records, etc.

Figure 5:
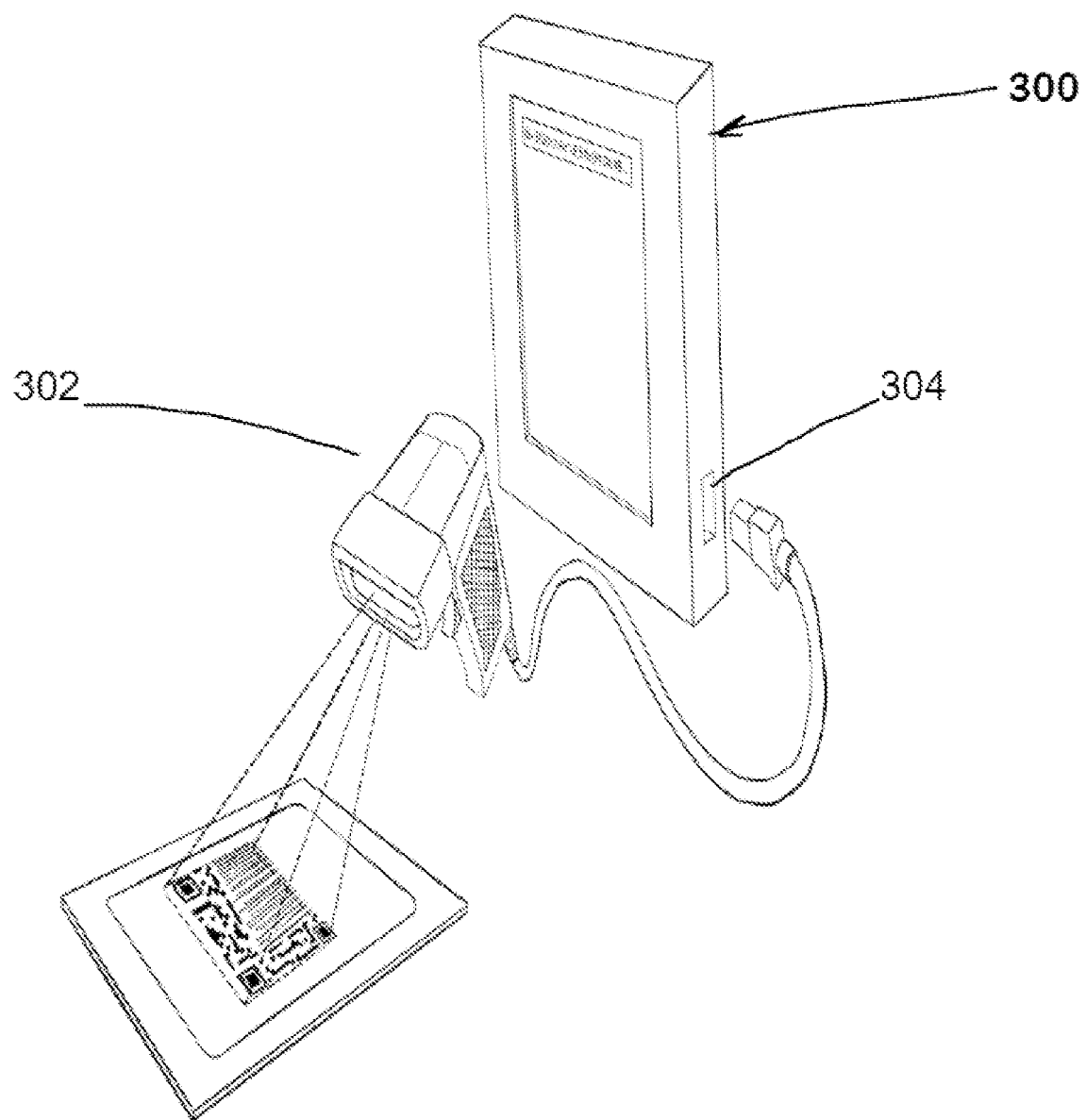
FIG. 5 is a diagrammatic illustration of a representative multi collectible storage apparatus scanning from an external device, in accordance with an embodiment of the present invention.
Figure 6:
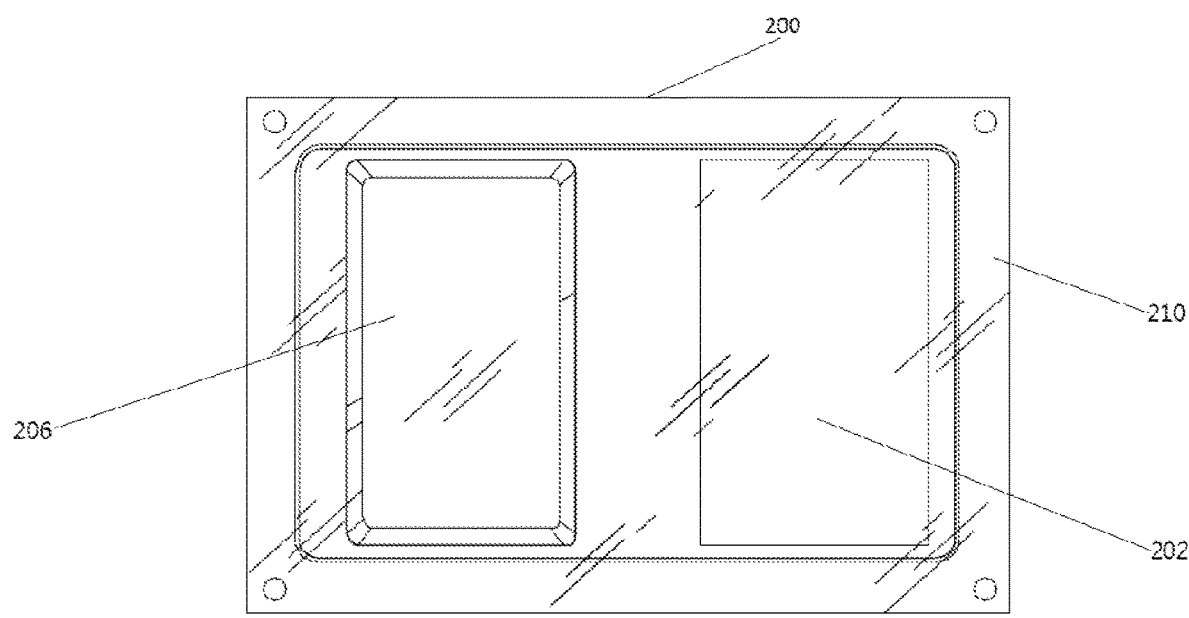
FIG. 6 is a diagrammatic illustration of the front side view of another embodiment of a multi collectible storage apparatus, in accordance with an embodiment of the present invention.
Figure 7:
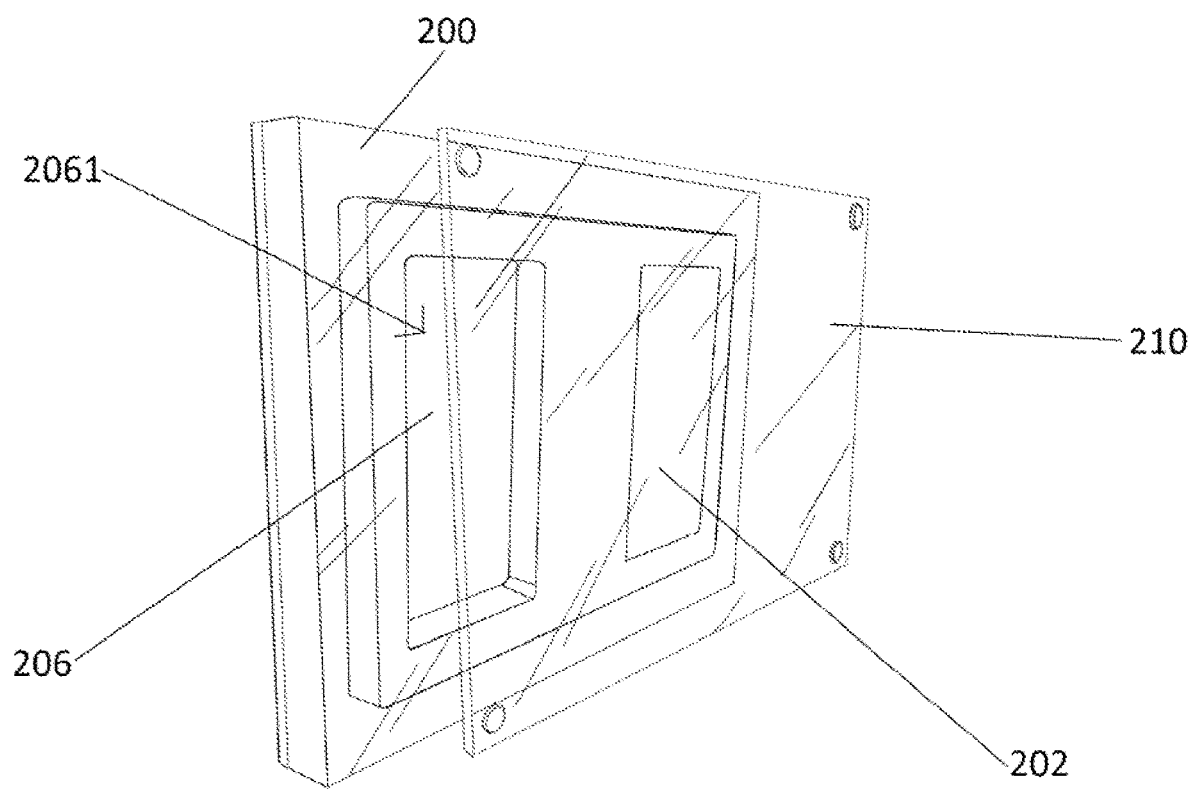
FIG. 7 is a diagrammatic illustration of the same side view of the same embodiment of the multi collectible storage apparatus for assortment of physical collectibles, in accordance with an embodiment of the present invention.
Figure 8A:
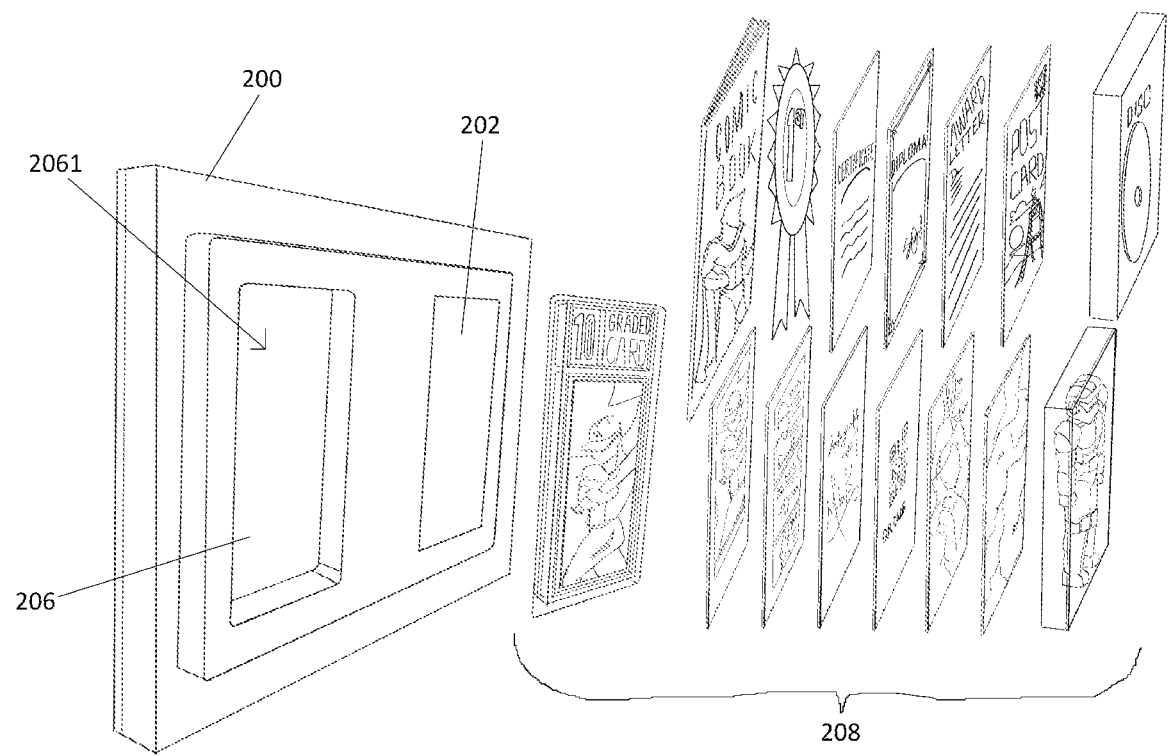
FIGS. 8A and 8B are diagrammatic illustrations showing that the physical collectible could be a trading card, toy figurine, comic book, medal, post card, disc, diploma, etc.
Figure 8B:
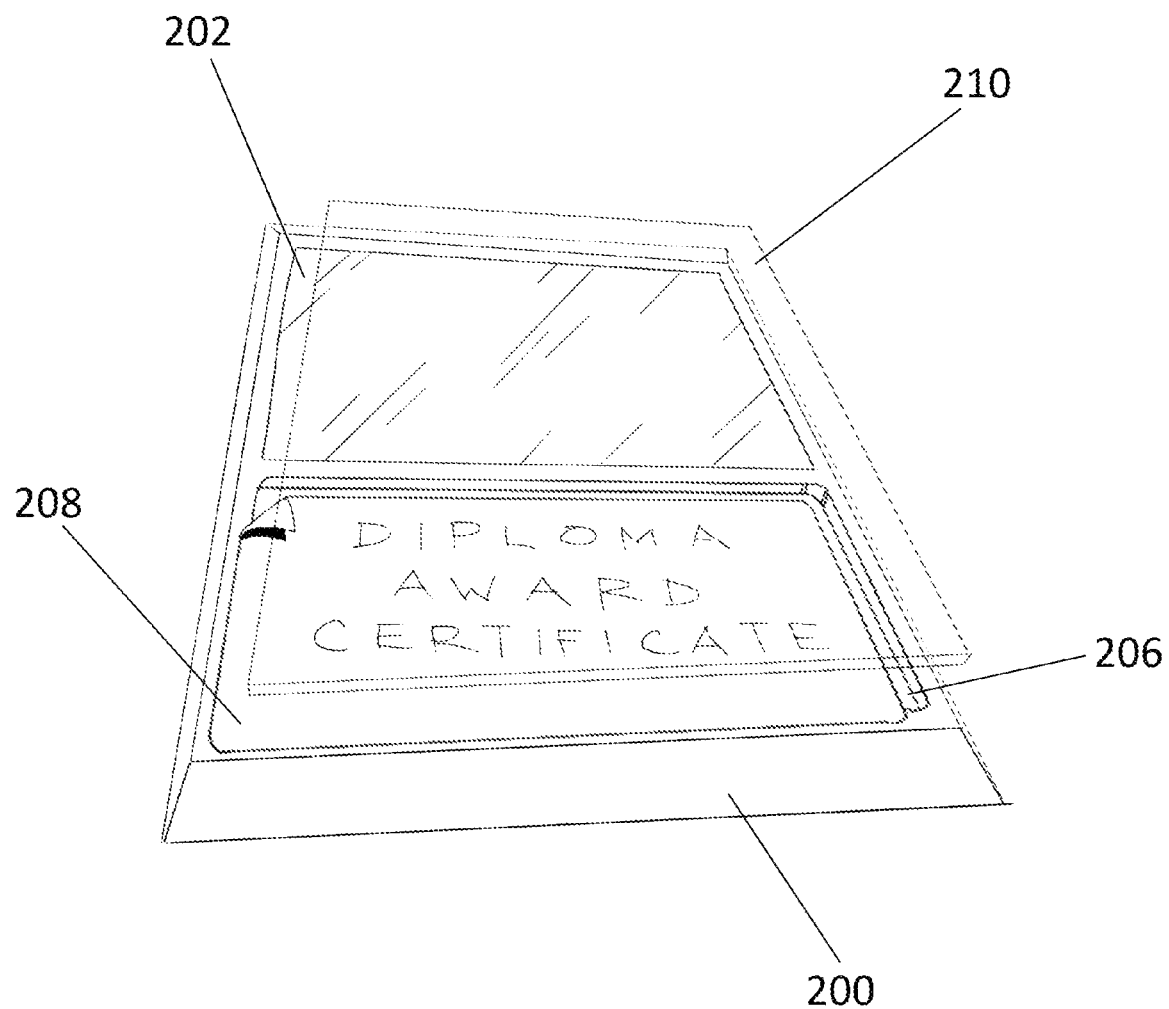

FIG. 5 is a diagrammatic illustration of a representative multi collectible storage apparatus connecting an external device, in accordance with an embodiment of the present invention. In this embodiment, the apparatus 300 connects with a or multiple external devices via a or multiple portal (s). In a preferable example as shown in FIG. 4, a gun-type scanner 302 is connected with the apparatus 300 via the cable plugging into a portal 304. Besides the gun-type scanner, the external device may be selected from a keyboard, monitor, USB Drive, Memory Drive, Cable, etc. Preferably, the apparatus 300 has a built-in memory card slot mounted on the edge of the apparatus. The above external devices may store or transfer the tokens via connection with the apparatus 300 so that the apparatus 100 can accomplish the identifying operations via the processor built in the apparatus 300.

FIGS. 6-8B are diagrammatic illustrations of another embodiment of a multi collectible storage apparatus, and showing that the physical collectible could be a trading card, trading card with protective casing, toy figurine, comic book, award, post card, disc, diploma, certificate, letter, photo, autograph photo, etc. In this embodiment, compared to the previous embodiments, the present invention provides a multi collectible storage apparatus 200, the apparatus comprising: a display electronic screen 202 on a surface of the apparatus 200, the screen 202 displaying a digital asset (not shown in these figures but in FIG. 1A-1E); and a storage protection enclosure compartment 206 on the surface of the apparatus 200, the enclosure compartment 206 storing a physical collectable 208, wherein the enclosure compartment 206 and the screen 202 are arranged side-by-side on the surface of the apparatus 200. In addition, the physical collectable is associated to the digital asset, and the digital asset could be an NFT. For the multi collectible storage apparatus mentioned in this embodiment or other embodiment, it could be a frame that can mount on the wall or place on the table. Therefore, it will have the corresponding structure (not shown in the drawings) for being a frame, like a mount hole or a supporting rod, for the multi collectible storage apparatus to be mounted on the wall or placed on the table.

Through above-mentioned structure, this embodiment provides a multi collectible storage apparatus 200, resulting in a combined storage and display of the digital asset and associated physical collectible. When in operation or utilization of the apparatus 200, collectors or observers can easily identify or observe the physical collectible side by side with the associated digital asset. Such an experience creates a sensation and stimulation emotionally in a deep impression, at the same moment that the physical collectibles are kept from decaying and contaminant.

In another aspect of the embodiment, the enclosure compartment 206 has a cavity 2061 shaped in the size and depth to fit the physical collectible 208. Under this situation, the physical collectible is exactly accommodated into the cavity 2061 without any extra gap or crinkle. Thus, it can be preserved and stored in a complete safe status and observed in a fully perspective view.

In another aspect of the embodiment, the apparatus 200 further comprises a convex cover 210 on the same surface to fit the cavity 2061 and screen 202. Such as the configuration for the enclosure compartment can ensure the seal between the surface and convex cover 210, preventing the dust, liquid or air from coming into the cavity 2061 to contaminate the physical collectible.

Preferably, the convex cover 210 is pivoted with the down edge or side edge on the surface of the apparatus 200, thereby establishing an integration of the convex cover 210 and the apparatus to facilitate the open or close the convex cover 210.

It will be apparent to one with skill in the art that the multi collectible storage apparatus(es) of the present invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention. For example, the respective elements or units in different embodiments described above have no limitations to apply to each single embodiment if applicable and necessary.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A multi collectible storage apparatus, the apparatus comprising:
    a display electronic screen on the front side, the screen displaying a digital asset; and
    a storage protection enclosure compartment on the back side, the enclosure compartment storing a physical collectible;
    wherein the physical collectible is associated to the digital asset, and
    the enclosure compartment has a cavity shaped in the size and depth to fit the physical collectible; accordingly, the apparatus further comprises a convex cover on the back side to fit the cavity, and the convex cover is pivoted with the down edge or side edge on the back side of the apparatus.

2. The apparatus of claim 1, wherein the digital asset is selected from NFTs (Non-Fungible Token), electronic books, audios, digital autographs, digital 3D artworks, or a combination thereof.

3. The apparatus of claim 1, wherein the physical collectible is selected from trading cards, decorative panels, works of art, autographs, photographs, comic books, QR codes, postcards, precious stones, and artifacts, collectible toys of figurines, sculptures, statistics and information, advertisements, and business cards.

4. The apparatus of claim 1, wherein the electronic screen displays NFTs, digital videos, photos, digital version of comic books, digital version of collectible cards, or a combination thereof.

5. The apparatus of claim 1, wherein the apparatus further comprises a built-in memory, storing multiple digital assets for displaying on the electronic screen.

6. The apparatus of claim 1, wherein the apparatus comprises a built-in speaker for audio output.

7. The apparatus of claim 1, wherein apparatus comprises at least one button for controlling the displaying of the digital asset on the screen.

8. The apparatus of claim 1, wherein the apparatus is running out of battery, the apparatus is turned over from the front side to the back side, exhibiting the physical collectible to observers.

9. A multi collectible storage apparatus, the apparatus comprising:
    a display electronic screen on the front side, the screen displaying NFT digital assets, wherein the digital assets are cryptographically secured in a decentralized database;
    a storage protection enclosure compartment on the back side, the enclosure compartment storing physical collectibles associated to the digital assets;
    a scanning unit to scan tokens, wherein the storage addresses of the digital assets are mapped into the tokens; and
    a processor to identify the tokens and retrieve the data from the decentralized database;
    wherein, the tokens are one-to-one corresponded to the digital assets exclusively.

10. The apparatus of claim 9, wherein the digital assets are selected from digital tokens, certificates, paintings, photographs, sculptures, GIFs, videos, audios, or the combination thereof.

11. The apparatus of claim 9, wherein the physical collectible is selected from trading cards, decorative panels, works of art, autographs, photographs, comic books, QR codes, postcards, precious stones, and artifacts, collectible toys of figurines, sculptures, physical media discs, diplomas, certificates, awards, letter, statistics and information, advertisements, and business cards.

12. The apparatus of claim 9, wherein the scanning unit is selected from a built-in camera, QR or Barcode scanner, or handle gun-type scanner.

13. A multi collectible storage apparatus, the apparatus comprising:
    a display electronic screen on a surface of the apparatus, the screen displaying a digital asset; and
    a storage protection enclosure compartment on the surface of the apparatus, the enclosure compartment storing a physical collectable, wherein the enclosure compartment and the screen are arranged side-by-side on the surface of the apparatus;
    wherein the physical collectable is associated to the digital asset, and
    the enclosure compartment has a cavity shaped in the size and depth to fit the physical collectible; accordingly, the apparatus further comprises a convex cover on the surface to cover the cavity and the screen.

14. The apparatus of claim 13, wherein the convex cover is pivoted with the down edge or side edge on the surface of the apparatus.

* * * * *